United States Patent
Araki et al.

[19]

[11] Patent Number: 5,868,340
[45] Date of Patent: Feb. 9, 1999

[54] PHOTO FILM WINDING METHOD AND WINDER APPARATUS FOR A PHOTO FILM CASSETTE

[75] Inventors: Minoru Araki; Makoto Shimizu; Masayuki Kubota, all of Kanagawa, Japan

[73] Assignee: Fuji Photo Film Co., Ltd., Kanagawa, Japan

[21] Appl. No.: 847,360

[22] Filed: Apr. 24, 1997

[30] Foreign Application Priority Data

Apr. 24, 1996 [JP] Japan .................................. 8-102625

[51] Int. Cl.⁶ .......................... B65M 18/10; G03D 15/00
[52] U.S. Cl. .................... 242/545; 242/532.6; 242/532.7
[58] Field of Search ................. 242/412, 532.4, 242/532.6, 532.7, 535, 535.3, 545

[56] References Cited

U.S. PATENT DOCUMENTS

| | | | |
|---|---|---|---|
| 3,910,516 | 10/1975 | Hoffacker et al. | 242/532.7 |
| 5,248,108 | 9/1993 | Zander . | |
| 5,301,892 | 4/1994 | Merz et al. | 242/532.6 |
| 5,462,240 | 10/1995 | Esaki et al. | 242/348.1 |
| 5,566,897 | 10/1996 | Yago et al. | 242/532.7 |
| 5,584,442 | 12/1996 | Watkins et al. | 242/532.6 |

*Primary Examiner*—John P. Darling
*Attorney, Agent, or Firm*—Sughrue, Mion, Zinn, Macpeak & Seas, PLLC

[57] ABSTRACT

A photo film cassette includes a spool for winding the photo film thereabout, and a cassette shell for containing the spool in a rotatable manner. The spool has first and second ends disposed to appear outside the cassette shell. To manufacture the photo film cassette, a cassette shell with the spool is retained while confronting a drive shaft with the first end and confronting a support shaft with the second end. The support shaft is slid in an axial direction, to support the second end. The spool is displaced via the support shaft to a braked state where rotation of the spool is blocked. The spool is displaceable between the braked state and a released state. The drive shaft is rotated and slid while the spool is in the braked state, to engage the drive shaft with the first end in a key-engaged manner. After the drive shaft is engaged with the first end, the spool is displaced from the braked state to the released state. The drive shaft is rotated to wind the photo film about the spool, which is rotated inside the cassette shell while supported by the support shaft and the drive shaft.

19 Claims, 9 Drawing Sheets

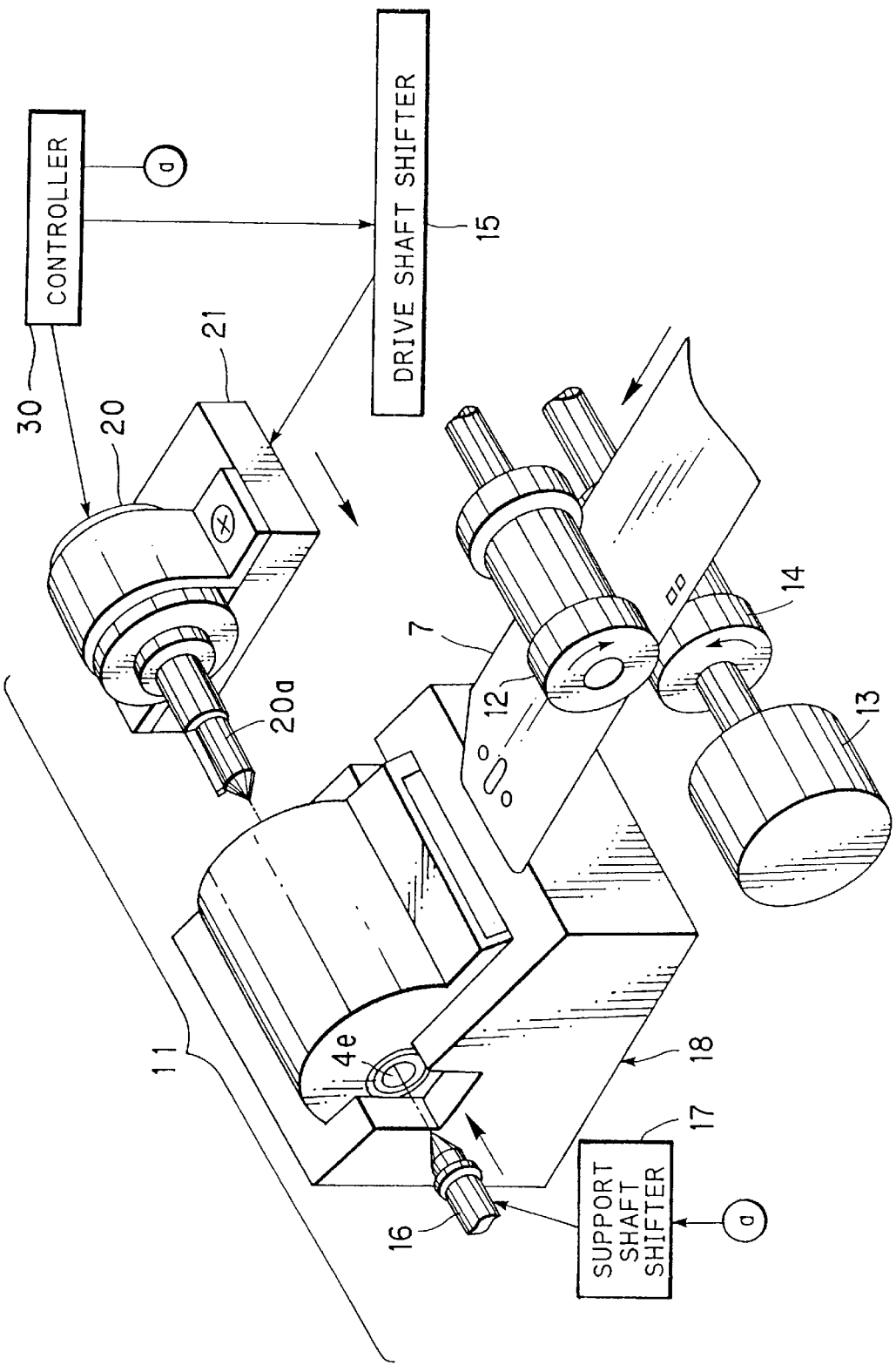

F I G. 2A
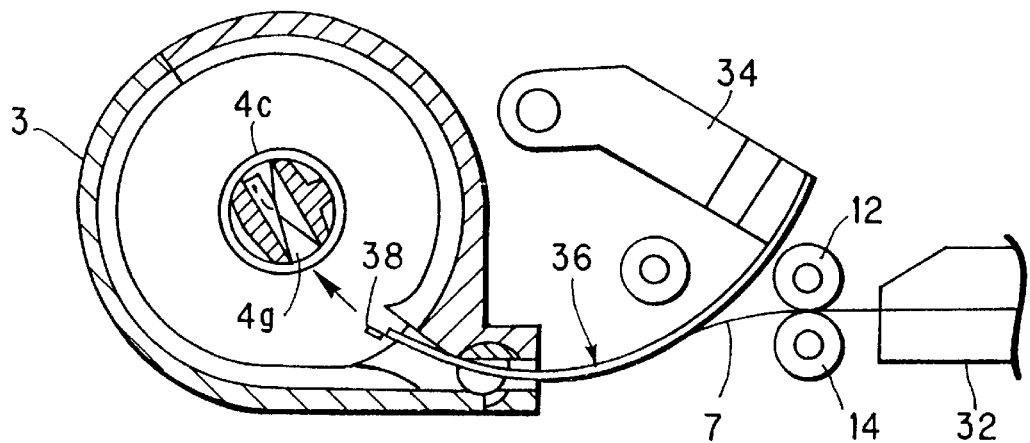

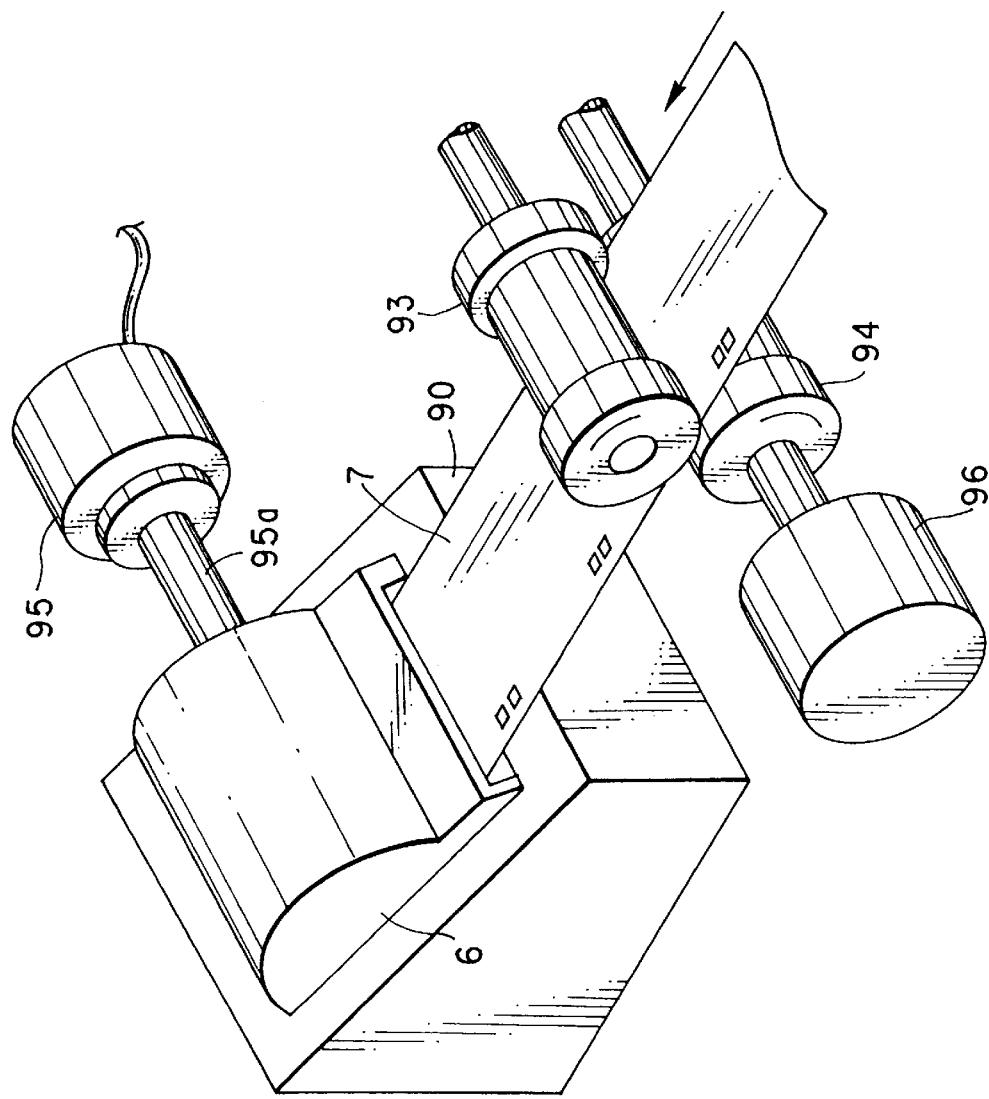

PHOTO FILM WINDING METHOD AND WINDER APPARATUS FOR A PHOTO FILM CASSETTE

BACKGROUND OF THE INVENTION

1. Field of the Invention

The present invention relates to a photo film winding method and a winder apparatus for a photo film cassette. More particularly, the present invention relates to a photo film winding method and a winder apparatus for winding photo film about a spool of a cassette being produced by rotating the spool.

2. Description Related to the Prior Art

U.S. Ser. No. 787,802 (corresponding to JP-A 5-224351) suggests a photo film cassette of the IX240 type, which is constructed so that, when the spool is rotated in a direction to unwind the photo film, a leader of the photo film is advanced through the photo film passage port to the outside of the cassette shell.

U.S. Pat. No. 5,462,240 (corresponding to JP-A 6-35128) discloses a method of producing the photo film cassette of the IX240 type. With reference to FIG. 1, flange disks 4a and 4b are mounted on axial ends of a spool core 4c, to obtain a spool 4. Respective shell halves 3a and 3b are molded by injection molding. A cassette shutter 5 is placed on the shell half 3b, on which the shell half 3a is fitted. Junctures between the shell halves 3a and 3b are welded by ultrasonic welding to attach the shell halves 3a and 3b, at the cassette shell 3 so that a photo film cassette 6 is obtained.

Then a trailer of a strip of photo film 7 is passed through a photo film passage port 3c, and secured to a trailer retainer 4g of the spool core 4c. The spool 4 is rotated to draw and wind the photo film 7 into it.

In FIG. 8, a conventional photo film winder apparatus is illustrated. The photo film cassette 6 after assembly is set in a cassette holder 90. The photo film 7 is passed between two tension rollers 93 and 94. The trailer of the photo film 7 is inserted in the photo film cassette 6. After the trailer is secured to the spool 4, (see FIG. 1) a drive shaft 95a is connected to a key-receiving first end 4i of the spool 4 with a key way. The drive shaft 95a is rotated by a motor 95 to draw and wind the photo film 7 into the photo film cassette 6. While the photo film 7 is wound, a brake mechanism 96 brakes the tension roller 94 so that the tension rollers 93 and 94 apply tension to the photo film 7 being wound. One of the two axial ends of the spool 4 opposite to the drive shaft 95a is pressed against a portion about a bearing hole 3g, because the one axial end is pulled in a direction from the spool 4 toward the tension rollers 93 and 94. The axial end is likely to push its bearing hole so forcibly that plastic dust or powder is created by scratches formed between them.

SUMMARY OF THE INVENTION

In view of the foregoing problems, an object of the present invention is to provide a photo film winding method and a winder apparatus which are capable of winding photo film at a high speed.

Another object of the present invention is to provide a photo film winding method and a winder apparatus in which parts of a photo film cassette are prevented from contacting one another thereby creating plastic dust or powder.

In order to achieve the above and other objects and advantages of this invention, a photo film cassette includes a spool adapted to winding the photo film thereabout, and a cassette shell adapted to containing the spool in a rotatable manner. The spool has first and second ends disposed to appear outside the cassette shell. To wind the photo film, at first a cassette shell is retained while confronting a drive shaft with the first end and confronting a support shaft with the second end. The support shaft is slid in an axial direction, to support the second end. The spool is displaced via the support shaft to a braked state where rotation of the spool is blocked, the spool being displaceable between the braked state and a released state. The drive shaft is rotated and slid while the spool is in the braked state, to engage the drive shaft with the first end in a key-engaged manner. After the drive shaft is engaged with the first end, the spool is displaced from the braked state to the released state. The drive shaft is rotated to wind the photo film about the spool, the spool being rotated inside the cassette shell while supported by the support shaft and the drive shaft.

In a preferred embodiment, the support shaft includes a projection for contacting a face of the second end, the projection pushing the spool in the axial direction to displace the spool to the braked state. Then the projection retreats from the second end to displace the spool to the released state from the braked state.

In another preferred embodiment, the support shaft includes a shaft core received in the second axial hole. A sleeve in which the shaft core is contained in a slidable manner, contacts a face of the second end and pushes the spool in the axial direction to displace the spool to the braked state. Then the sleeve retreats from the face of the second end to displace the spool to the released state from the braked state.

In still another preferred embodiment, the drive shaft has a first ring-shaped projection for contacting a face of the first end. The support shaft has a second ring-shaped projection for contacting a face of the second end. After the support shaft is engaged with the second axial hole, the support shaft causes the second projection to apply first force for pushing the spool in the axial direction so as to displace the spool to the braked state. After the drive shaft is engaged with the first axial end, the drive shaft causes the first projection to apply second force for pushing the spool in the axial direction, the second force being greater than the first force, the spool being displaced to the released state by the first projection sliding back the spool to the winding position.

In a further preferred embodiment, brake means is connected to the support shaft, and applies rotational load to the support shaft, for displacing the spool to the braked state.

BRIEF DESCRIPTION OF THE DRAWINGS

The above objects and advantages of the present invention will become more apparent from the following detailed description when read in connection with the accompanying drawings, in which:

FIG. 2 is a perspective illustrating a photo film winder apparatus with the photo film cassette;

FIG. 2A is a side elevation illustrating a trailer securing device in the photo film winder apparatus;

FIG. 8 is a perspective illustrating a known photo film winder apparatus with the photo film cassette according to the prior art.

DETAILED DESCRIPTION OF THE PREFERRED EMBODIMENTS OF THE PRESENT INVENTION

Figure 1:
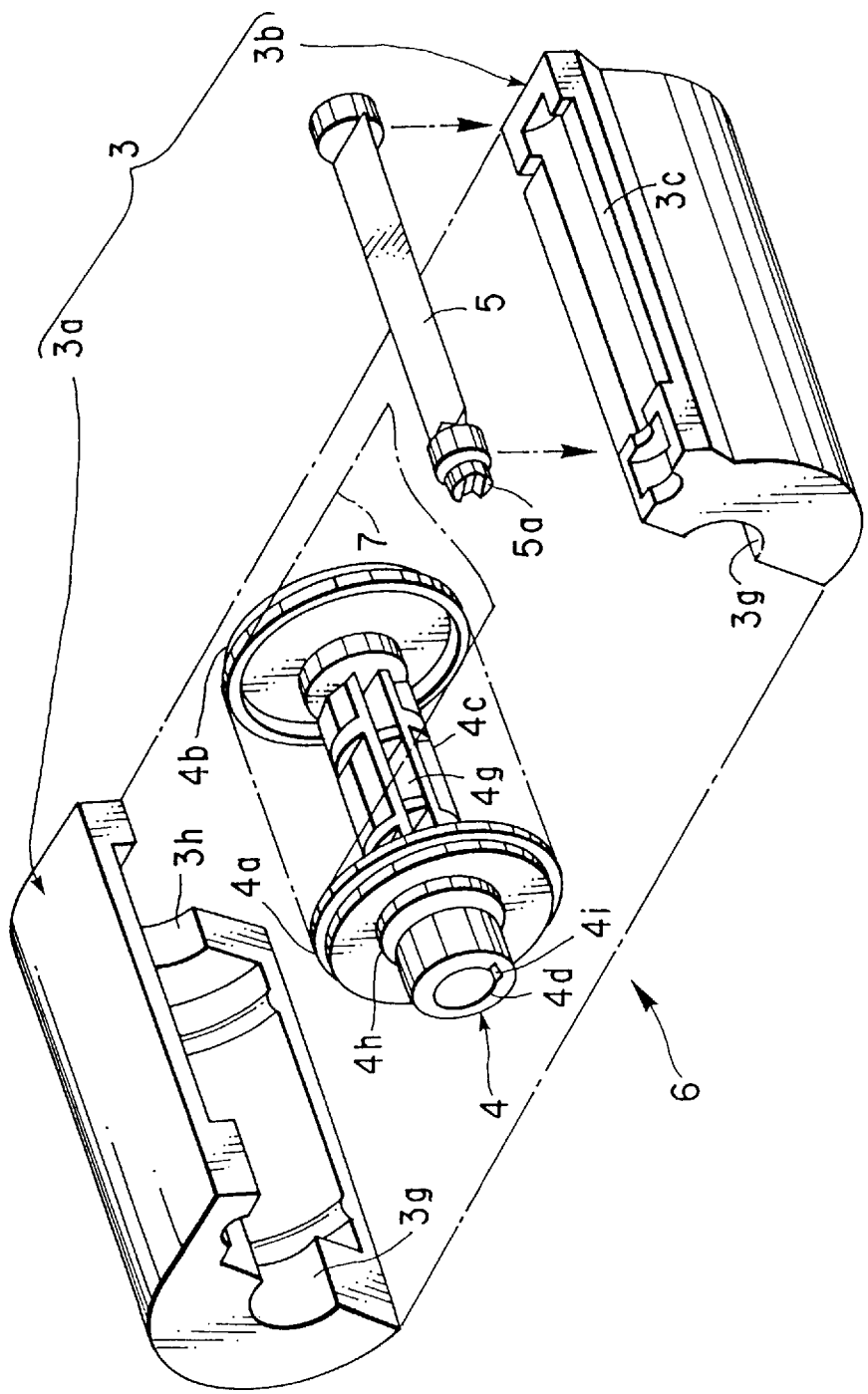
FIG. 1 is an exploded perspective illustrating a photo film cassette.
Figure 3:
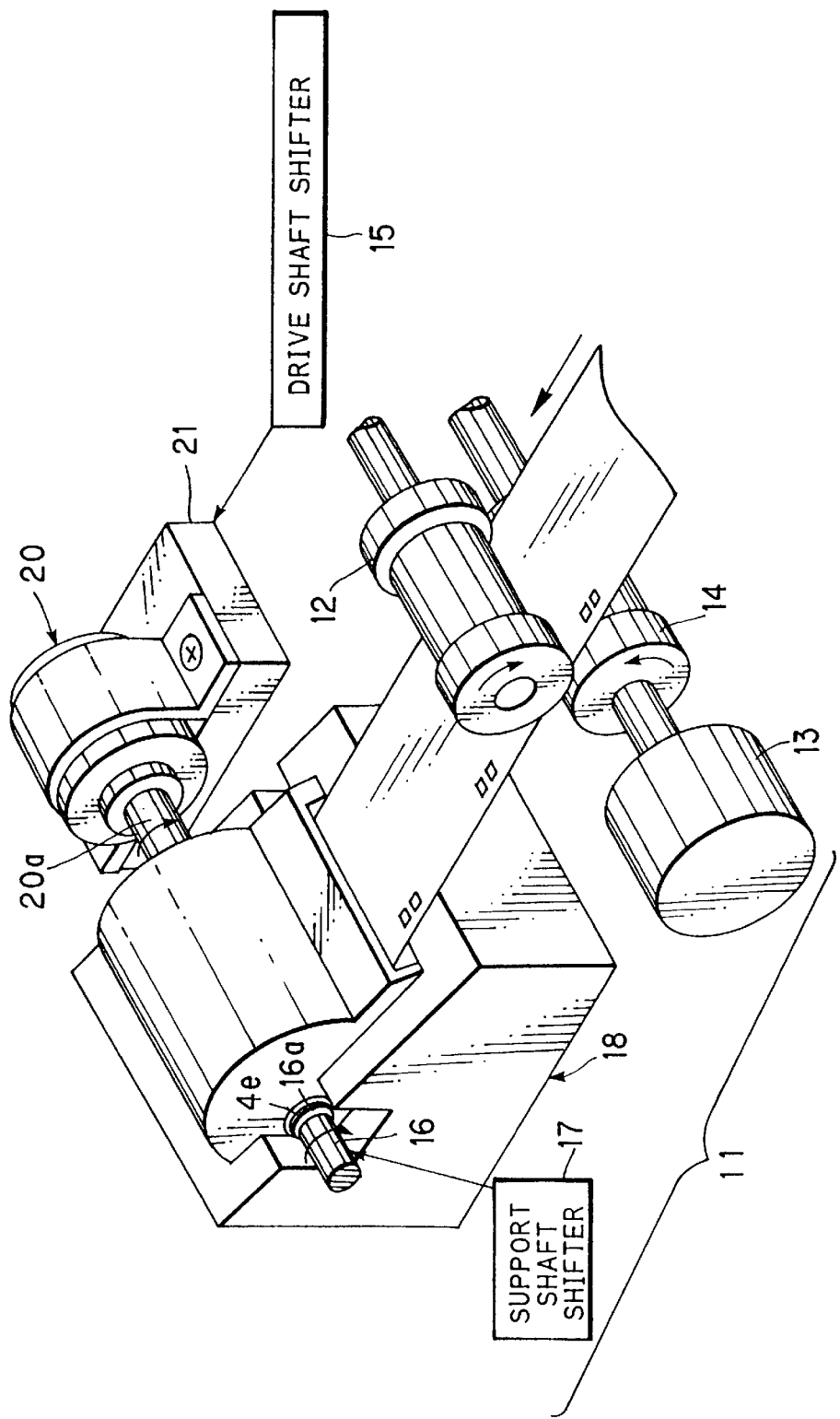
FIG. 3 is a perspective illustrating an operating state of the photo film winder apparatus with the photo film cassette.

In FIG. 1 illustrating a photo film cassette 6 of the IX240 type, the photo film cassette 6 consists of a cassette shell 3 and a spool 4 with a strip of photo film 7. The spool 4 is rotatable in the cassette shell 3. The photo film 7 is wound about the spool 4 in a roll form. The cassette shell 3 is constituted by two shell halves 3a and 3b. A spool core 4c of the spool 4 has a trailer retainer 4g, to which a trailer of the photo film 7 is secured. Ring portions 4h are formed with the spool core 4c and near to its axial ends. Each of the ring portions 4h has a groove extending circularly. There are flange disks 4a and 4b secured in the respective grooves of the ring portions 4h. The flange disks 4a and 4b have a peripheral edge along which a circumferential lip projects toward a central position of the roll of the photo film 7. The circumferential lips prevents the outermost one of the turns of the photo film 7 from being loose about the spool core 4c.

A pair of bearing holes 3g and 3h are formed between the shell halves 3a and 3b. When the shell halves 3a and 3b are assembled, the ends of the spool 4 are received respectively in the bearing holes 3g and 3h and supported in a rotatable manner. The ring portions 4h have a diameter greater than the bearing holes 3g and 3h. An outer flat face of the ring portions 4h contacts the inside of the cassette shell 3 when the spool 4 is rotated.

The spool 4 has a key-receiving first end 4i in which a key way is formed as cutout inside it. In FIG. 2, the spool 4 has a hole-formed second end 4e in which an axial hole is formed as cutout inside it. The key-receiving first end 4i appears through the bearing hole 3g in a face of the photo film cassette 6. The hole-formed second end 4e appears through the bearing hole 3h in a face of the photo film cassette 6. When a camera is loaded with the spool 4, a drive shaft of the camera is engaged with the key-receiving first end 4i for the purpose of rotating the spool 4. A projection of the camera is inserted in the hole-formed second end 4e, so that the spool 4 is supported in two directions in the camera.

A photo film passage port 3c is defined between the shell halves 3a and 3b for the purpose of passage of the photo film 7. A cassette shutter 5 is contained in the photo film passage port 3c in a rotatable manner. A key way 5a is formed in one distal end of the cassette shutter 5, and appears through an end face of the cassette shell 3. When a camera is loaded with the cassette, a shutter drive shaft of the camera is engaged with the key way 5a, and rotates the cassette shutter 5 to open the photo film passage port 3c. When the cassette has a free state without being loaded in a camera, the cassette shutter 5 closes the photo film passage port 3c to keep the photo film cassette 6 from entry of ambient light.

As is known in the field of containers for photosensitive material, the photo film cassette 6 of the IX240 type is constructed so that, when the spool 4 is rotated in a direction to unwind the photo film 7, a leader of the photo film 7 is advanced through the photo film passage port 3c to the outside of the cassette shell 3.

In FIGS. 2, 3, 4A and 4B, a photo film winder apparatus 11 is illustrated. The winder apparatus 11 includes a pair of tension rollers 12 and 14, a brake mechanism 13, a motor 20, a drive shaft shifter 15 or slider or push mechanism, and a support shaft shifter 17 or slider or push mechanism. The tension rollers 12 and 14 nip the photo film 7 therebetween, and rotate together for applying tension to the photo film 7. The brake mechanism 13 is directly connected to the tension roller 14 axially, and applies load to the tension roller 14. The motor 20 drives the spool 4. The drive shaft shifter 15 pushes a drive shaft 20a of the motor 20 into the key-receiving first end 4i of the spool 4. The support shaft shifter 17 pushes a support shaft 16 into the hole-formed second end 4e of the spool 4, for connecting the support shaft 16 to the spool 4. The support shaft shifter 17 also operates as a brake device, as will be described later. Note that a controller 30 is connected to the motor 20, the drive shaft shifter 15 and the support shaft shifter 17, and controls them sequentially.

The tension rollers 12 and 14 have a respective pair of disk portions at their ends with a greater diameter. Only the disk portions contact the photo film 7 so that frame regions of the photo film 7 are prevented from contacting the tension rollers 12 and 14 and protected from being scratched. The photo film herein is a type having one train of perforations of which two are associated with one of the frames.

The tension roller 12 is axially supported in a freely rotatable manner. Unlike the tension roller 12, the tension roller 14 has the brake mechanism 13 connected thereto. The brake mechanism 13 brakes rotation of the tension roller 14, so that load or tension is applied to the photo film 7 being fed into the photo film cassette 6 upon passing between the tension rollers 12 and 14.

A cassette holder 18 has a recess into which the photo film cassette 6 is insertable in a fitted manner. Approximately a half of the photo film cassette 6 is contained inside the recess 18a while the photo film cassette 6 is supported in the cassette holder 18. The cassette holder 18 has three lateral notches or cutouts, through which the hole-formed second end 4e, the key-receiving first end 4i and the key way 5a are externally accessible.

Each of the drive shaft shifter 15 and the support shaft shifter 17 structurally consists of a pneumatic or hydraulic cylinder mechanism. The drive shaft shifter 15 shifts a base plate 21 on which the motor 20 is mounted. The drive shaft 20a of the motor 20 has a key portion, which is connectable to the key way in the key-receiving first end 4i. An axial end of the support shaft 16 is tapered with a decreasing width, which smooths insertion of the support shaft 16 into the hole-formed second end 4e. A push projection 16a or push flange is formed with the support shaft 16 and has a circular shape. When the support shaft shifter 17 inserts the support shaft 16 into the hole-formed second end 4e, the push projection 16a is pressed against the edge portion of the hole-formed second end 4e about its hole. An associated one of the ring portions 4h of the spool 4 is pressed against the inside surface of the photo film cassette 6, frictionally to brake rotation of the spool 4.

In FIG. 2A, a trailer securing device 36 is depicted. The trailer securing device 36 consists of a combination of a rotating arm 34 and an inserter plate 38 with a pick-up claw.

The trailer of the photo film 7 supplied by a supplier 32 is picked up the by the inserter plate, and inserted into the spool core 4c and retained on the trailer retainer 4g. Note that, in FIG. 2, the trailer securing device 36 is omitted for the purpose of clarifying structural depiction. After the spool 4 is released from the braking operation, the drive shaft 20a initially sets the spool 4 in a predetermined rotational orientation of FIG. 2A adapted to securing of the trailer of the photo film 7 to the spool 4. After the spool 4 is set in the predetermined rotational orientation, the trailer is secured by the trailer securing device 36 to the spool 4, before the drive shaft 20a is further rotated.

The operation of the present invention is described now. The photo film cassette 6 after assembly is set in the recess 18a of the cassette holder 18 while directing the photo film passage port 3c upstream with respect to the photo film 7. If the cassette shutter 5 closes the photo film passage port 3c, a shutter drive shaft (not shown) of the winder apparatus rotates the key way 5a of the cassette shutter 5 to set the cassette shutter 5 open.

Figure 4A:
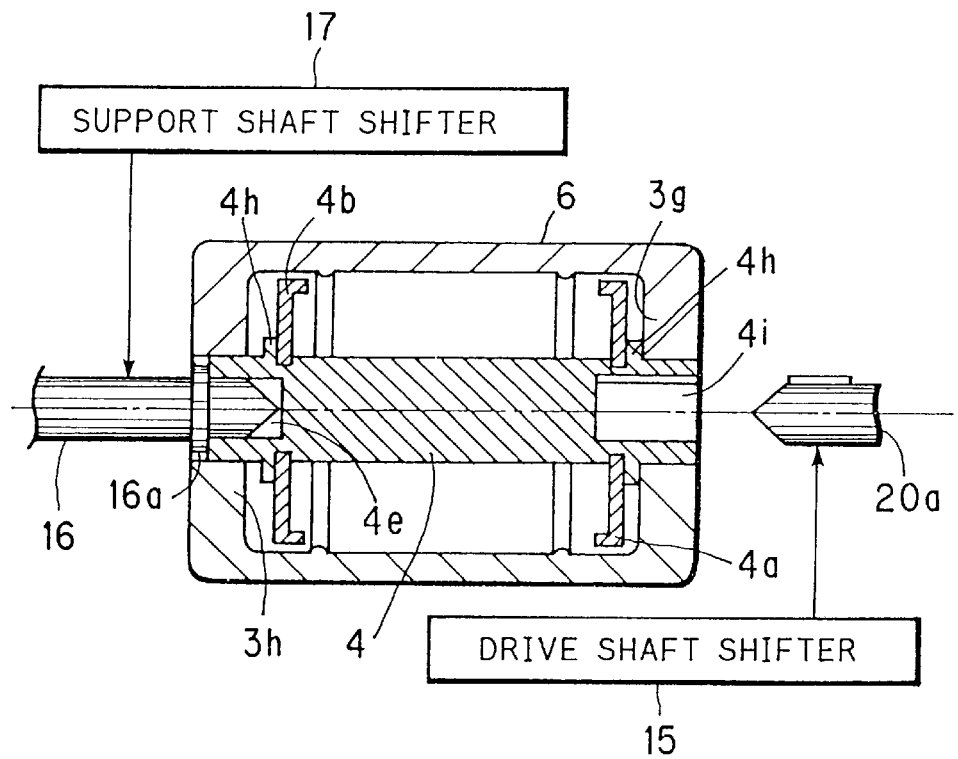
FIG. 4A is an explanatory view in section illustrating a state where a support shaft of the winder apparatus pushes a spool of the photo film cassette.
Figure 4B:
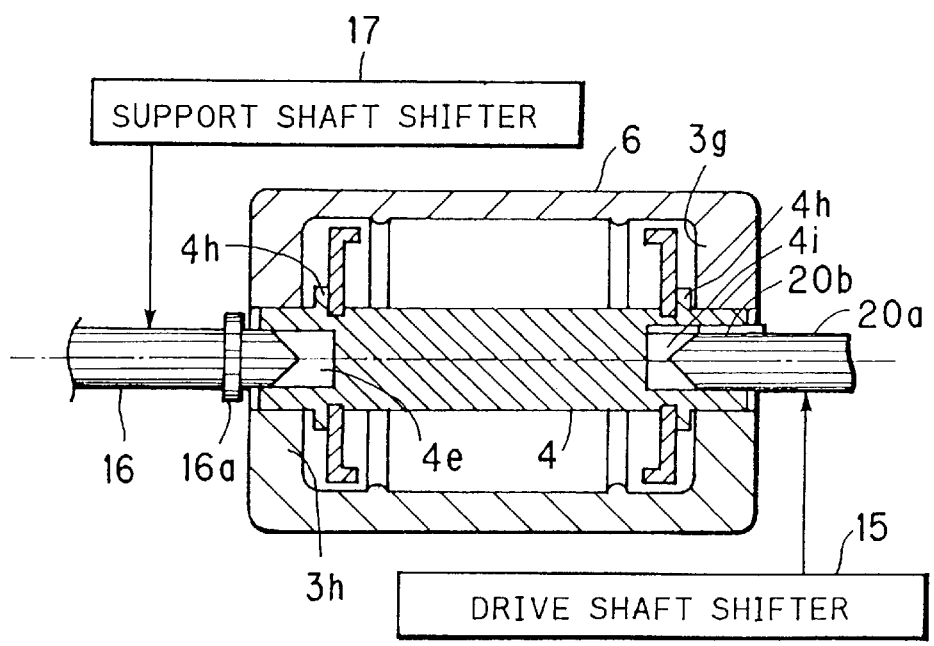
FIG. 4B is an explanatory view in section illustrating a state where the spool of the photo film cassette is positioned between a drive shaft and the support shaft.

The support shaft shifter 17 inserts the support shaft 16 into the hole-formed second end 4e of the spool 4. The push projection 16a pushes the hole-formed second end 4e to shift the spool 4 in the axial direction. In FIG. 4A, the one of the ring portions 4h nearer to the key-receiving first end 4i is pressed against the inside of the photo film cassette 6 in a frictional manner, so that rotation of the spool 4 is braked. Then the motor 20 is driven to rotate the drive shaft 20a. While the drive shaft 20a rotates, the drive shaft shifter 15 presses the drive shaft 20a against an axial hole 4d (see FIG. 1) of the spool 4 at the key-receiving first end 4i, until the key being rotated is received in the key way. Upon receipt of the key portion in the key way, the drive shaft 20a is inserted in the axial hole 4d. The spool 4 is prevented from rotating by the friction between the ring portions 4h and the bearing hole 3g, so that the axial hole 4d is kept stationary during the rotation of the drive shaft 20a. Thus the drive shaft 20a can be inserted in the axial hole 4d of the spool 4 without fail.

The photo film 7 is passed between the tension rollers 12 and 14, the trailer securing device 36 of FIG. 2A as a tool for insertion, inserts the trailer of the photo film 7 into the photo film cassette 6 through the photo film passage port 3c, to secure the trailer to the trailer retainer 4g of the spool 4. Then the support shaft shifter 17 shifts the support shaft 16 back to a predetermined winding position of FIG. 4B to release the spool 4 from being braked. The spool 4 is now rotatable lightly. The spool 4 is rotated at high speed by the motor 20, to draw and wind the photo film 7 into the photo film cassette 6 through the photo film passage port 3c. The spool 4 is stably supported between the support shaft 16 and the drive shaft 20a, so that no axial deviation of the spool 4 occurs during the rotation.

The predetermined tension is applied to the photo film 7 by the brake mechanism 13 while the photo film 7 is fed into the photo film cassette 6 for the purpose of eliminating looseness. The spool 4 also receives the winding tensile force, but is not involved with a problem of creating scratched dust or powder in frictional contact between the spool 4 and the photo film cassette 6. This is because the spool 4 is positioned both axially and radially by cooperation of the support shaft 16 and the drive shaft 20a. It is possible to wind the photo film 7 about the spool 4 smoothly and at high speed.

When the entirety of the photo film 7 is wound in the spool 4 including its leader, the cassette shutter 5 is closed to shield the photo film cassette 6 from ambient light. The winding operation of the photo film 7 is finished.

Figure 5A:
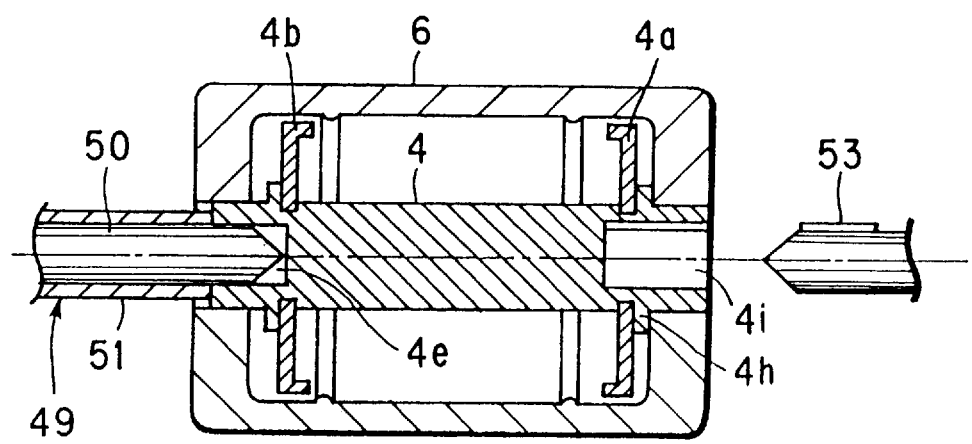
FIGS. 5A and 5B are explanatory views in section illustrating another preferred embodiment in which a support shaft includes a shaft core and a sleeve.
Figure 5B:
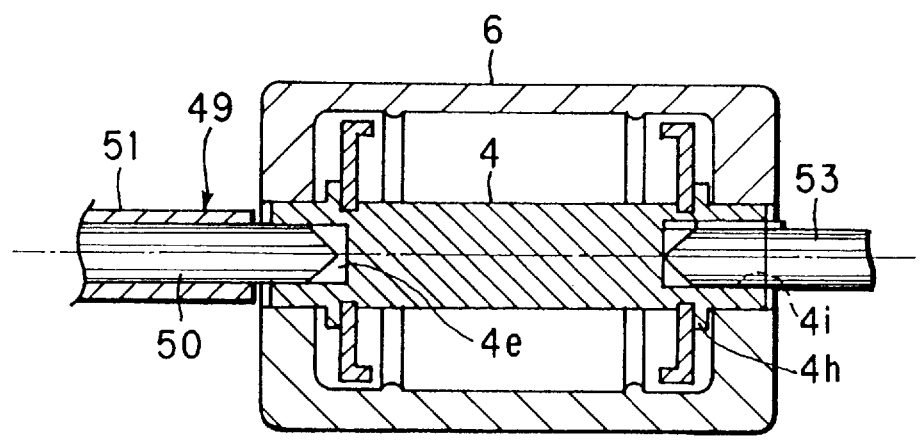

In FIGS. 5A–7B, other preferred embodiments are illustrated. In FIGS. 5A and 5B, a support shaft 49 consists of a combination of a shaft core 50 and a sleeve 51 disposed around the shaft core 50 in a slidable manner. The sleeve 51 operates as a brake device. The shaft core 50 is initially inserted in the hole-formed second end 4e of the spool 4. To connect a drive shaft 53 to the key-receiving first end 4i, the sleeve 51 in FIG. 5A is pushed against the edge portion of the hole-formed second end 4e about its hole so as to brake rotation of the spool 4. To wind the photo film, the sleeve 51 is pulled back by the support shaft shifter to release the spool 4 from being braked. Then the drive shaft 53 is driven. In FIG. 5B, the shaft core 50 positions the spool 4 both axially and radially, so that the photo film 7 can be wound about the spool 4 smoothly and at high speed.

Figure 6A:
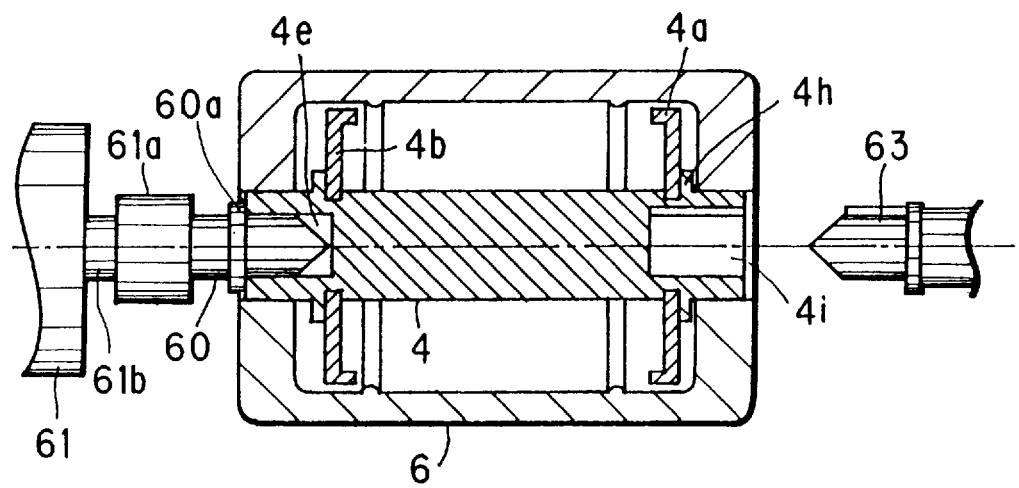
FIGS. 6A and 6B are explanatory views in section illustrating a further preferred embodiment in which a brake device is directly connected to a support shaft.
Figure 6B:
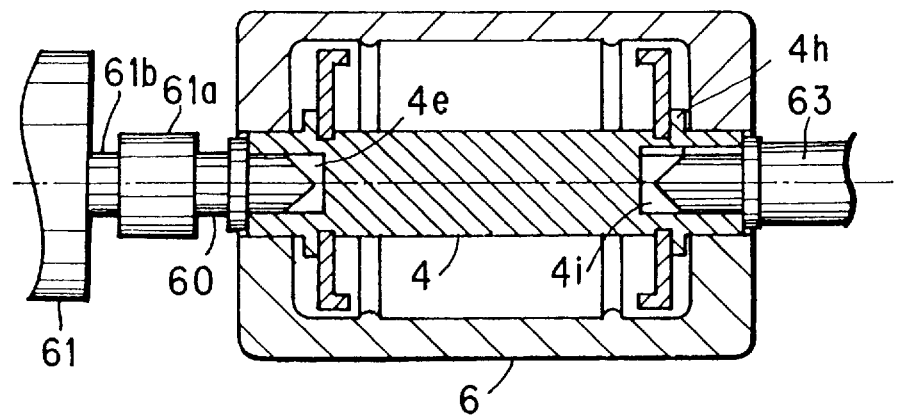

In FIGS. 6A and 6B, a support shaft 60 is secured to a brake shaft 61b of a brake device 61 by a chuck mechanism 61a, for the brake device 61 to brake rotation of the support shaft 60. While the brake device 61 brakes the support shaft 60, the support shaft 60 is pushed against the hole-formed second end 4e of the spool 4, for frictional contact of a push flange 60a to the spool 4. In FIG. 6A, the push flange 60a brakes the spool 4. Then a drive shaft 63 is rotated. While rotated, the drive shaft 63 is engaged with the key-receiving first end 4i. Then the brake device 61 stops the braking operation. A support shaft shifter for the support shaft 60 operates for positioning of the spool 4 both axially and radially, to obtain the winding position of FIG. 6B. Then the photo film is wound.

Figure 7A:
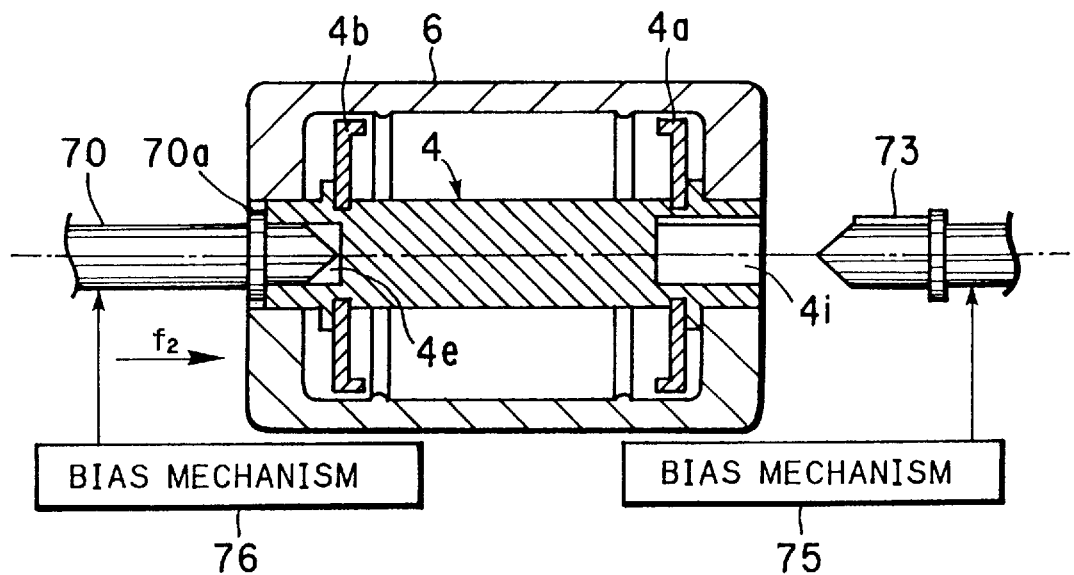
FIGS. 7A and 7B are explanatory views in section, illustrating still another preferred embodiment in which a drive shaft is pushed with a force different from the force with which a support shaft is pushed.
Figure 7B:
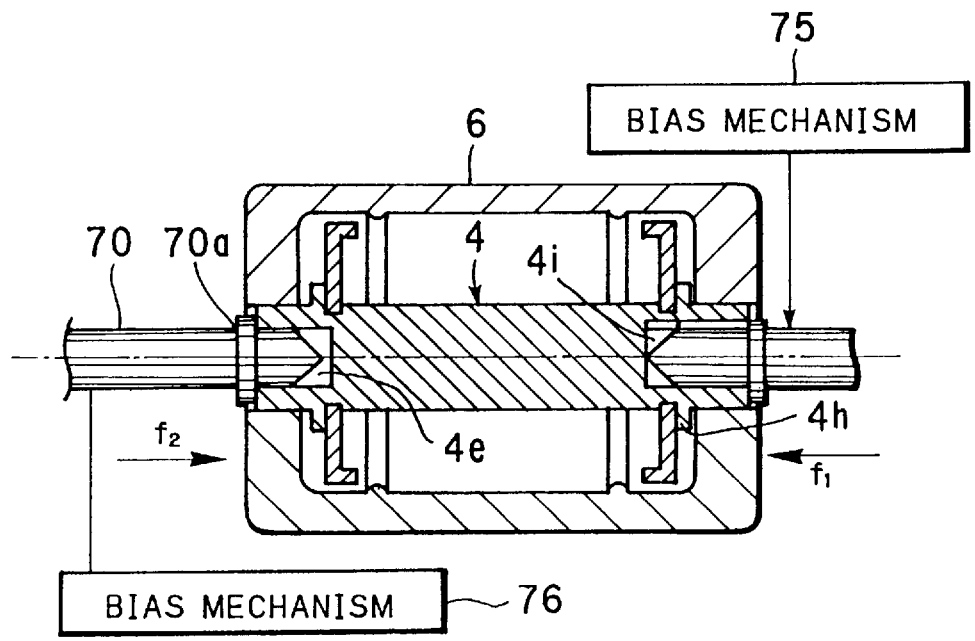

In FIGS. 7A and 7B, a support shaft 70 for engagement with the hole-formed second end 4e is associated with a bias mechanism 76, which biases the support shaft 70 in an axial direction of the spool 4. A drive shaft 73 for engagement with the key-receiving first end 4i is associated with a bias mechanism 75, which biases the drive shaft 73 in the axial direction. In FIG. 7A, the bias mechanism 76 causes the support shaft 70 to push the spool 4 at pushing force f2 by contact of a push projection 70a or push flange of the support shaft 70. While the bias mechanism 75 does not bias, the drive shaft 73 is rotated and also moved to the key-receiving first end 4i of the spool 4.

To engage the drive shaft 73 with the key-receiving first end 4i, the bias mechanism 75 in FIG. 7B pushes the drive shaft 73 axially with pushing force f1 against the force f2. The spool 4 receives forces f1 and f2 in opposite directions. The force f1 is determined as f1>f2. Accordingly the force of the bias mechanism 75 is so effective that the spool 4 is shifted to the winding position. The drive shaft 73 is rotated while the spool 4 is supported between the drive shaft 73 and the support shaft 70.

It is to be noted that, before operating the bias mechanism 76, a support shaft shifter (not shown) slides the support shaft 70 to the hole-formed second end 4e. Before operating the bias mechanism 75, a drive shaft shifter slides the drive shaft 73 to the key-receiving first end 4i.

In the above embodiments, the cassette has the cassette shutter of a rotatable structure. Alternatively it is possible in the cassette to use a plush or light-trapping fabric with a great number of pile threads, for the purpose of light-tight shielding of the photo film passage port with ease in passage of the photo film. In the above embodiments, the photo film has one train of perforations of which two are associated with one of the frames. Alternatively the cassette can contain a 35 mm photo film with two trains of perforations of which eight are associated with one of the frames.

In the above embodiments, the support shaft is initially engaged with the spool 4 by the support shaft shifter 17, 76 in an automatic manner. It is however possible to eliminate the support shaft shifter 17, 76 and manually to engage the spool 4 to a support shaft lacking the axial shiftability.

In FIGS. 4A, 5A and 7A, the one of the ring portions 4h nearer to the key-receiving first end 4i is pressed against the inside of the photo film cassette 6 in a frictional manner for the purpose of braking the spool 4. Alternatively the flange disk 4a without the ring portion 4h can be directly pressed against the inside of the photo film cassette 6 frictionally.

In the above embodiments, the spool 4 has the flange disks 4a and 4b. However the cassette can use a spool without the flange disks 4a and 4b. In such a spool, the photo film is wound about the spool core 4c between the ring portions 4h.

In the above embodiments, the drive shaft shifter 15, 75 and the support shaft shifter 17, 76 are controlled electrically by the controller 30. It is however possible to use mechanically controlled shifters for shifting the drive shaft 20a, 53, 63, 73 and the support shaft 16, 49, 60, 70 without using the controller 30.

It is to be noted that, in order to shift the support shaft 16, 49, 60, 70 in a direction away from the cassette, the support shaft 16, 49, 60, 70 can be pulled by the support shaft shifter 17, 76, or else can be pushed by the spool 4 in the same direction. It is possible to combine the pulling of the support shaft shifter 17, 76 and the pushing of the spool 4 for the purpose of shifting the support shaft 16, 49, 60, 70 in the same direction.

In the support shaft 16, 49, 70, the push projection 16a, 70a or the sleeve 51 pushes an outer surface of the hole-formed second end 4e to shift the spool 4 axially. Alternatively, the push projection 16a, 70a or the sleeve 51 may be eliminated. The shaft core 50 or the support shaft 16, 70 being straight without the push projection 16a, 70a may directly push a bottom of the hole-formed second end 4e to shift the spool 4 axially.

In the above embodiments, the key-receiving first end 4i and the hole-formed second end 4e are differently termed. In an actual construction of the spool 4, each of the key-receiving first end 4i and the hole-formed second end 4e has both an axial hole and a key way, so that the key-receiving first end 4i has the same shape as the hole-formed second end 4e.

In the above embodiments, after the drive shaft 20a is engaged with the spool 4, the trailer of the photo film 7 is secured by the trailer securing device 36 to the spool 4, before the drive shaft 20a is further rotated. Alternatively it is possible in the present invention that the trailer of the photo film 7 is initially secured by the trailer securing device 36 to the spool 4, before the operation in which the cassette shell 3 is placed in the cassette holder 18 for engagement of the drive shaft 20a with the spool 4.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film winding method for a photo film cassette, said photo film cassette including a spool for winding said photo film thereabout, and a cassette shell for containing said spool in a rotatable manner, said spool having first and second ends disposed to appear outside said cassette shell, said photo film winding method comprising steps of:

retaining said cassette shell while confronting a drive shaft with said first end and confronting a support shaft with said second end;

sliding said support shaft in an axial direction, to support said second end;

displacing said spool via said support shaft to a braked state where rotation of said spool is blocked, said spool being displaceable between said braked state and a released state;

rotating and sliding said drive shaft while said spool is in said braked state, to engage said drive shaft with said first end in a key-engaged manner;

after said drive shaft is engaged with said first end, displacing said spool from said braked state to said released state; and rotating said drive shaft to wind said photo film about said spool, said spool being rotated inside said cassette shell while supported by said support shaft and said drive shaft.

2. A photo film winding method as defined in claim 1, further comprising a step of applying tension to said photo film while said spool winds said photo film.

3. A photo film winding method as defined in claim 2, wherein said first end has a first axial hole for receiving insertion of said drive shaft, and has a key way for receiving insertion of a key portion of said drive shaft; and said second end has a second axial hole for receiving insertion of said support shaft.

4. A photo film winding method as defined in claim 3, wherein said cassette shell includes first and second bearing holes respectively for supporting said first and second ends of said spool;

said spool includes first and second ring portions disposed respectively near to said first and second bearing holes and inside said cassette shell.

5. A photo film winding method as defined in claim 4, further comprising steps of:

after said spool is displaced to said released state, setting said drive shaft in a predetermined rotational orientation; and inserting a trailer into said cassette shell for securing said trailer to said spool, before said spool is rotated to wind said photo film.

6. A photo film winding method as defined in claim 5, wherein said support shaft causes said second end to slide said spool beyond a winding position, so as to displace said spool to said braked state by pressure of said first ring portion to an edge of said first bearing hole, then said spool is slid back to said winding position, so as to displace said spool to said released state by releasing said first ring portion from said edge of said first bearing hole, and said spool is rotated in said winding position to wind said photo film.

7. A photo film winding method as defined in claim 6, wherein said support shaft includes a projection for contacting a face of said second end, said projection pushing said spool in said axial direction to displace said spool to said braked state, and then said projection retreating from said second end to displace said spool to said released state from said braked state.

8. A photo film winding method as defined in claim 6, wherein said support shaft includes:

a shaft core insertable in said second axial hole; and a sleeve in which said shaft core is contained in a slidable manner, said sleeve contacting a face of said second end and pushing said spool in said axial direction while said second shaft core is inserted in said second axial hole, to displace said spool to said braked state, and then said sleeve retreating from said face of said second end to displace said spool to said released state from said braked state.

9. A photo film winding method as defined in claim 6, wherein said drive shaft has a first ring-shaped projection for contacting a face of said first end;

said support shaft has a second ring-shaped projection for contacting a face of said second end;

after said support shaft is engaged with said second axial hole, said support shaft causes said second projection to apply first force for pushing said spool in said axial direction so as to displace said spool to said braked state;

after said drive shaft is engaged with said first axial end, said drive shaft causes said first projection to apply second force for pushing said spool in said axial direction, said second force being greater than said first force, said spool being displaced to said released state by said first projection sliding back said spool to said winding position.

10. A photo film winding method as defined in claim 5, wherein brake means is connected to said support shaft, applies rotational load to said support shaft, for displacing said spool to said braked state.

11. A photo film winder apparatus for a photo film cassette, said photo film cassette including a spool for winding said photo film thereabout, and a cassette shell for containing said spool in a rotatable manner, wherein said cassette shell includes first and second bearing holes, said spool has first and second ends supported respectively in said first and second bearing holes, and has first and second ring portions disposed respectively near to said first and second bearing holes and inside said cassette shell, said photo film winder apparatus comprising:

a cassette holder for retaining said cassette shell;

a drive shaft engageable with said first end in a key-engaged manner;

drive shaft slider means for sliding said drive shaft in an axial direction to connect said drive shaft with said first end;

a motor for rotating said drive shaft;

a support shaft for supporting said second end of said spool;

support shaft slider means for sliding said support shaft in said axial direction to support said second end, and further for pushing said second end to slide said spool from a winding position to a braked position, wherein when said spool is in said winding position, said spool is rotatable, and when said spool is in said braked position, said first ring portion is pressed to an edge of said first bearing hole to block rotation of said spool; and a controller for controlling said drive shaft slider means, said motor and said support shaft slider means to effect a sequential operation, wherein said drive shaft slider means is operated for said support shaft to support said second end, and to displace said spool to said braked position from said winding position, wherein said motor and said drive shaft slider means are operated for rotating and sliding said drive shaft to engage said drive shaft with said first end, wherein said support shaft slider means is operated for displacing said spool from said braked position to said winding position, and wherein said motor is operated for rotating said drive shaft, said drive shaft rotating said spool in said winding position to wind said photo film about said spool.

12. A photo film winder apparatus as defined in claim 11, further comprising tension means for applying tension to said photo film while said spool winds said photo film.

13. A photo film winder apparatus as defined in claim 12, wherein said first end has a first axial hole and a key way which receive insertion of said drive shaft;

said second end has a second axial hole for receiving insertion of said support shaft; and said drive shaft has a first shaft core fitted in said first axial hole, and has a key portion fitted in said key way.

14. A photo film winder apparatus as defined in claim 13, further comprising trailer securing means for inserting a trailer into said cassette shell for securing said trailer to said spool, wherein upon finishing engagement of said drive shaft to said first end, said drive shaft is set in a predetermined rotational orientation, and then said trailer securing means is operated.

15. A photo film winder apparatus as defined in claim 14, wherein said support shaft includes:

a second shaft core insertable in said second axial hole; and a ring-shaped projection for contacting a face of said second end, said ring-shaped projection pushing said spool in said axial direction while said second shaft core is inserted in said second axial hole, to displace said spool to said braked position from said winding position, and then said ring-shaped projection retreating from said face of said second end to allow displacing said spool to said winding position from said braked position.

16. A photo film winder apparatus as defined in claim 14, wherein said support shaft includes:

a second shaft core insertable in said second axial hole; and a sleeve in which said second shaft core is contained in a slidable manner, said sleeve contacting a face of said second end and pushing said spool in said axial direction while said second shaft core is inserted in said second axial hole, to displace said spool to said braked position from said winding position, and then said sleeve retreating from said face of said second end to allow displacing said spool to said winding position from said braked position.

17. A photo film winder apparatus as defined in claim 14, wherein said drive shaft has a first ring-shaped projection for contacting a face of said first end;

said support shaft has a second ring-shaped projection for contacting a face of said second end;

after said support shaft is engaged with said second axial hole, said support shaft causes said second projection to apply first force for pushing said spool in said axial direction so as to displace said spool to said braked position;

after said drive shaft is engaged with said first axial end, said drive shaft causes said first projection to apply second force for pushing said spool in said axial direction, said second force being greater than said first force, said spool being slid back by said first projection, and displaced to said winding position.

18. A photo film winder apparatus for a photo film cassette, said photo film cassette including a spool for winding said photo film thereabout, and a cassette shell for containing said spool in a rotatable manner, wherein said cassette shell includes first and second bearing holes, said spool has first and second ends supported respectively in said first and second bearing holes, and has first and second ring portions disposed respectively near to said first and second bearing holes and inside said cassette shell, said photo film winder apparatus comprising:

a cassette holder for retaining said cassette shell;

a drive shaft engageable with said first end in a key-engaged manner;

drive shaft slider means for sliding said drive shaft in an axial direction to connect said drive shaft with said first end;

a motor for rotating said drive shaft;

a support shaft for supporting said second end of said spool;

support shaft slider means for sliding said support shaft in said axial direction to support said second end;

brake means for applying rotational load to said support shaft, for blocking rotation of said spool; and a controller for controlling said drive shaft slider means, said motor, said support shaft slider means and said brake means to effect a sequential operation, wherein said drive shaft slider means is operated for said support shaft to support said second end, wherein said brake means is operated to block rotation of said spool, wherein said motor and said drive shaft slider means are operated for rotating and sliding said drive shaft to engage said drive shaft with said first end, wherein then said brake means is rendered ineffective, and wherein said motor is operated for rotating said drive shaft, said drive shaft rotating said spool to wind said photo film about said spool between said drive shaft and said support shaft.

19. A photo film winder apparatus as defined in claim 18, further comprising:

tension means for applying tension to said photo film while said spool winds said photo film; and trailer securing means for inserting a trailer into said cassette shell for securing said trailer to said spool, wherein upon finishing engagement of said drive shaft to said first end, said drive shaft is set in a predetermined rotational orientation, and then said trailer securing means is operated.

* * * * *